United States Patent [19]

Edo et al.

[11] 4,396,638
[45] Aug. 2, 1983

[54] EDIBLE FAT-CONTAINING COMPOSITION HAVING GOOD WHIPPING PROPERTIES

[75] Inventors: Hiroshi Edo, Omiya; Yasuo Okutomi, Kawagoe, both of Japan

[73] Assignee: Asahi Denka Kogyo Kabushiki Kaisha, Tokyo, Japan

[21] Appl. No.: 283,516

[22] Filed: Jul. 15, 1981

[30] Foreign Application Priority Data

Jul. 19, 1980 [JP] Japan ................................. 55-98934

[51] Int. Cl.³ .......................... A23D 3/00; A23D 5/00
[52] U.S. Cl. .................................... 426/564; 426/570; 426/602; 426/604; 426/613
[58] Field of Search ............... 426/570, 602, 603, 604, 426/605, 613, 564

[56] References Cited

U.S. PATENT DOCUMENTS

| | | | |
|---|---|---|---|
| 1,701,084 | 2/1929 | Richardson et al. | 426/613 |
| 2,162,585 | 6/1939 | Musher | 426/605 X |
| 3,300,318 | 1/1967 | Szczesniak et al. | 426/605 |
| 3,542,565 | 11/1970 | Stauffer | 426/605 |
| 3,883,670 | 5/1975 | Pennings et al. | 426/613 X |
| 3,968,261 | 7/1976 | Goodman | 426/613 X |
| 4,140,808 | 2/1979 | Jonson | 426/605 X |
| 4,175,142 | 11/1979 | Hahn et al. | 426/613 X |

*Primary Examiner*—Robert A. Yoncoskie
*Attorney, Agent, or Firm*—Frishauf, Holtz, Goodman & Woodward

[57] ABSTRACT

An edible emulsion having good whipping characteristics comprising an aqueous phase containing lipoprotein material and optionally lipoprotein film coated globular fat particles, and a continuous fat phase having dispersed therein globular fat particles which are coated with lipoprotein film. The emulsion consists essentially of between about 25% and 90% by weight of total fat based on the weight of the emulsion and between about 10% and 75% of total aqueous phase based on the weight of the emulsion, said total fat comprising the globular fat particles and the continuous fat phase, and said globular fats being present in an amount more than about 0.1 ml per gram of total fat when the amount of said globular fat particles is determined by the analytical procedure disclosed in the specification.

15 Claims, No Drawings

EDIBLE FAT-CONTAINING COMPOSITION HAVING GOOD WHIPPING PROPERTIES

BACKGROUND OF THE INVENTION

The present invention provides an improved edible fat-containing emulsion having good characteristics for use in confectionery toppings and fillings. It is readily whipped and formed into desired shapes and has good storage characteristics.

There have been two typical whipped cream type compositions used for the preparation of confectionery toppings and fillings. One type is a whipping cream which is made from dairy cream or a synthetic cream having characteristics similar to dairy cream. The second whipping cream is referred to as buttercream which is made from butter or margarine. Whipping cream and buttercream each have advantages and disadvantages which are a consequence of the type of emulsion which characterizes the respective cream.

Whipping cream is a fat-in-water emulsion. It has a very good mouth feel and very good thin melting characteristics, i.e., it is considered to melt easily in the mouth providing a fresh and non-sticky sensation in the mouth. Whipping cream has the disadvantage that it readily deteriorates to an unacceptable product within a few days in a refrigerated showcase. Recently, whipping cream itself or cakes having toppings made from whipping cream are preserved in a freezer. Over a period of time in a freezer, water evaporates from the surface of the whipping cream resulting in a drying of the surface and a deterioration in at least the appearance of the product resulting in economic loss in the value of the product as a commodity to be sold. This prevents preservation of whipping cream and whipping cream containing products for a long storage period. Whipping creams have the further disadvantage that confectionery ingredients having a low pH, such as jam and sour milk, destroy the emulsion which forms the whipping cream and therefore cannot be included in whipping cream. Whipping cream has the advantage that it is not necessary to utilize a complicated or complex processing operation to form the whipped cream into desired shapes, such as a flower.

Buttercream is a water-in-fat emulsion. The mouth feel when tasting buttercream is dependent upon the melting point of the blending fat which is used. It has the disadvantage that the flavor of the aqueous phase is difficult to ascertain as a taste sensation. It also has the disadvantage that it tends to leave a greasy sensation in the mouth. Buttercream has the advantage that it is readily processed, and materials having low pH values can be incorporated in the buttercream. Buttercream also has the advantage of good storage characteristics under ordinary (ambient) temperature conditions, refrigeration and freezing conditions.

It is an object of the present invention to provide a novel margarine composition which has the superior mouth feel and very thin melting characteristics of whipping cream, together with the good storage and processing characteristics of butter-cream.

THE INVENTION

The present invention provides an edible emulsion referred to as "margarine" which is an emulsion comprising globular fats coated with a lipoprotein film suspended in a continuous fat phase. The emulsion also contains an aqueous phase. The invention also provides a margerine emulsion comprising an aqueous phase containing globular fats coated with lipoprotein film which are emulsified in said continuous fat phase. The margarine emulsion may be whipped into desired forms.

The total fat content is between about 25 and 90% by weight of said emulsion, and the total aqueous phase content is between about 10 and 75% by weight of said emulsion. The amount of said coated globular fat particles in said emulsion is more than 0.1 ml per gram of the fat phase (the total fat content of said emulsion) and preferably less than about 1.5 ml per gram. The aforesaid values for the amounts of globular fats in the margarine emulsion are based upon the globular fat content determined by the analytical procedure set forth hereinafter.

As a general rule, the presence of globular fats suspended in the continuous fat phase of butter is seldom observed. It is considered that globular fats in butter are derived during the butter-making process from the cream. Most of the globular fat content of the cream is destroyed during the churning processes or cooling and kneading processes occurring in the continuous butter-making machines. Only a small portion of the residual globular fats are suspended in the continuous phase of butter. It is considered that the good characteristics that butter has of resistance against heat at high temperatures results from the existence of such globular fats. Prior art methods of quantitative analysis to determine the globular fat content of butter have typically been unsatisfactory. In the centrifugal method, butter is melted and centrifuged to separate into the continuous fat phase and into globular fats. The separation is incomplete. Globular fats are destroyed during the melting and separating procedures. In the dilution method, butter is melted and diluted by oil. The amount of globular fats is determined by counting the globular fat particles in a sample under magnification. This procedure tends to destroy globular fast during melting, diluting and the procedures for processing the sample to be microscopically studied. In all of these methods, globular fats are destroyed by melting and/or separating and/or diluting and/or sampling procedures, to provide unsatisfactory and/or incomplete quantitative analysis results.

To accomplish the present invention, a precise new quantitative analysis for globular fats present in a fat-containing emulsion, which is free of the problems and difficulties which beset the prior art analytical methods, was invented. The details of this method follow:

1. Five grams of the sample of the emulsion which is being analyzed is cooled to a temperature below the melting point of the emulsion and admixed with 5 grams of cooled (liquid) carbon tetrachloride in a 15 ml test tube.
2. The emulsion is thoroughly dissolved in the carbon tetrachloride taking care not to elevate the temperature of the emulsion sample.
3. The sample of the emulsion which is dissolved in carbon tetrachloride is processed by centrifuging in a Kokusan Enshinki K.K. Type 103 N4 at 4000 r.p.m. for 30 minutes.
4. The sample of the emulsion separates into a carbon tetrachloride-containing fat phase and an aqueous phase which does not contain carbon tetrachloride and which contains the globular fats, protein coagulated, the globular fats together with comparatively clear protein dissolved in water, or the protein coagulation together with comparatively clear protein dissolved water. The aqueous phase which does not contain carbon tetrachloride may be the upper layer, the middle layer or the bottom layer in the test tube, depending upon its specific gravity. A sample of the aqueous phase is examined under a microscope to determine whether it contains globular fats or coagulated protein.

5. If it is determined by the examination that the sample contains globular fats, the volume of globular fats in milliliters is measured.
6. The fat ratio of the emulsion is determined according to the method of JAS (Japanese Agricultural Standards Notification No. 381, Article 4 of the Ministry of Agriculture and Forestry) margarine fat measurement. The determination of the globular fats per gram of the fat phase is calculated by the following equation:

$$(A/B \times C),$$

wherein A is the volume of globular fats in milliliters, B is the weight of the sample of the emulsion in grams, and C is the fat ratio of the emulsion. The said JAS margarine fat measurement is incorporated by reference.

Utilizing the aforedescribed analytical method, the globular fat content of butter varieties purchased on the market was determined with the results depicted in Table 1.

TABLE 1

| | Amount of Globular Fats (ml/g) | |
|---|---|---|
| Butter A | 0.02 | (most is coagulation of protein) |
| Butter B | 0.03 | " |
| Butter C | 0.03 | " |
| Butter D | 0.02 | " |

Based on the aforesaid reported results, the amount of globular fats in butter ranges from 0.02 to 0.03 ml/g.

It was noted that butter contains globular fats suspended in the continuous fat phase but that the amount of said globular fats is within the range of 0.02 to 0.03 ml per gram. Margarine emulsions were prepared which contained amounts of globular fats in excess of the amount of the globular fats in butter and the processes of manufacturing said margarine emulsions and their characteristics were studied and evaluated. It was discovered that margarine emulsions can be produced that have better mouth feel and better thin melting characteristics than butter and margarine. It was particularly noted that when the margarine emulsions of the present invention are whipped, they have much better thin melting characteristics than that of buttercream. It was discovered that when the margarine emulsion of the present invention contains globular fats in an amount more than about 0.1 ml/g, and preferably more than about 0.15 ml/g, and wherein the continuous phase is a fat phase, said margarine emulsion when whipped and tasted results in the same good mouth feel and thin melting characteristics as whipping cream and the same good characteristics in connection with processing and stability during storage (preservation) as buttercream.

It is assumed that the reason why the margarine emulsion of the present invention has this unusual effect when being whipped is that as the concentration (amount of globular fats in said emulsion is higher than 0.1 ml/g and when it is whipped, air bubbles are entrained in the continuous fatty phase and as the volume increases, the amount of the continuous fatty phase enveloping the globular fat particles becomes lower in a relative sense and simultaneously the continuous fat phase which envelops the globular fat particles becomes very thin. When such a whipped emulsion is eaten, the thin melting which is characteristic of whipping cream is found because the outer (continuous) fat phase which is very thin is scarcely tasted. Because the globular fat particles are enveloped in thin fat films which are in the nature of molecular films, infection by microorganisms is guarded against, and the same good storage characteristics as those of buttercream are obtained.

The fat which is used in the fat phase in the margarine of the present invention can be any edible fat, such as vegetable fats and oils, animal fats and oils, mixtures thereof, treated fats and oils obtained by treating any of the aforenoted fats and/or oils by a chemical or physical method. Examples of such fats and oils which may be used as the fat phase in the margarine emulsion include milk fat, soybean oil, cottonseed oil, kopok oil, coconut oil, lard, tallow, fish oil, whale oil, cocoa butter, sunflower oil, safflower oil, corn oil, palm oil, rapeseed oil, rice bran oil, and the like, and the hardened oil which is obtained by hydrogenation and/or crystallization and/or interesterification of the aforenoted oils and fats. The fat phase may contain oil-soluble adjuvants, such as emulsifiers, coloring materials, flavoring materials, antioxidants, etc.

The margarine emulsions of the present invention preferably contain at least one emulsifier which is preferably selected from the group consisting of glycerol fatty acids, derivatives of glycerol fatty esters such as the acetic, citric, lactic and diacetyl tartaric acid esters of glycerol fatty acid esters, sucrose fatty acid esters, sorbitan fatty acid esters, propylene glycol fatty acid esters, lecithin, polyoxyethylene fatty acid esters, polyoxyethylene sorbitan fatty acid esters, polyglycerol fatty acid esters, glycerol, and polyglycerol condensed fatty acid esters.

Emulsifiers are included in the margarine emulsion of the present invention in an amount not more than 3% by weight of the whole emulsion and preferably in an amount in excess of 0.008% by weight.

The aqueous phase of the margarine emulsion comprises water and lipoprotein, which is preferably in an amount more than 0.6% by weight of the margarine emulsion. The aqueous phase may also contain water soluble adjuvants such as milk products, for example whole milk powder, skim milk powder, whey powder, buttermilk powder, milk casein, sodium caseinate, calcium caseinate, acid precipitated casein, whole milk, skim milk, buttermilk, whey, cheese, lactalbumin, serum albumin; egg white and other animal proteins, vegetable proteins such as soy, wheat and the like, and microorganism protein; flavoring materials, stabilizing and thickening agents such as starch, gelatin, gum and the like; sweeteners such as sucrose, glucose, frucose, maltose, stevioside, lactose, and the like; fruits, fruit juice, soured milk, coffee, peanut paste, almond paste, cocoa mass, cocoa powder, salt, sodium glutimate, water soluble emulsifiers and the like.

The margarine emulsion of the present invention may be whipped utilizing air, nitrogen or the like, before or during processing of the margarine emulsion in the production thereof, or after it has been produced.

The lipoproteins which are used in the margarine emulsion are lipid-protein complexes which are not generally denatured by exposure to heat, acid, alkali, freezing, solvents and the like. Lipoprotein exists in the serum of cattle, goats, sheep and the like; in eggs of marine animals such as salmon, cod fish, trout, carp, sea urchin, and the like; in eggs of fowl such as hens, quails, pheasants, ducks, ostriches, and the like, and in biological membranes. The amount of lipoprotein present in the margarine emulsion has an important effect on the globular fat content so that said content becomes more than 0.1 ml per gram of total fat content of the emulsion. When the content of lipoprotein is less than 0.60% by weight of said emulsion, the globular fat content of the emulsion will not exceed 0.1 ml per gram of total fat content and the desired characteristics of the margarine emulsions of this invention are rapidly lost. The lipoprotein content should be more than 0.6% and preferably more than 1.3% by weight of the margarine emulsion.

Although the amount (quantity) of globular fat particles in the margarine emulsion depends upon the conditions under which the margarine emulsion is processed (produced), the quantity of globular fat particles roughly correlates to the lipoprotein content of the emulsion. When one or more of the emulsifiers are used together with the lipoprotein, the heat-resistant property of the whipped cream product at high temperatures is improved and the oil- of characteristics are improved. When emulsifiers are used together with the lipoproteins, the effect on the characteristics of the margerine emulsion which depend from a specified content of lipoproteins are obtained at a lower content of lipoprotein than would be required to attain the same characteristics if the emulsion did not also contain emulsifiers. In this case, the lipoprotein content should be more than 0.3%, preferably more than 0.7%.

The aqueous phase is in an amount between about 10 and 75% by weight of the margarine emulsion and preferably in an amount of between about 25 and 60%. When the amount of the aqueous phase is more than about 75%, droplets of water "weep" (are formed) and the storage stability characteristics of the emulsion are adversely effected and if such a high aqueous phase emulsion is aerated by mechanical working, the aqueous phase separates and the emulsion is destroyed. When the aqueous phase is less than 10%, the minimum required amount of globular fats is not attained in the emulsion and the mouth feel of the emulsion is that of buttercream. When the globular fat content and overrun* are the same and the aqueous phase concentration of the emulsion differs, the flavor of the margarine emulsion containing from 25 to 75% of the aqueous phase is closer to the flavor of whipping cream than that of a margarine emulsion containing 10 to 25% of the water phase.
*(whipped specific volume/original specific volume − 1) × 100

Various processes may be used to prepare the margarine emulsions of the present invention. A novel process for preparing said margarine emulsion follows. Between 25 and 95% by weight of the fat phase and between 10 and 75% of the aqueous phase are premixed. The state of the premixed emulsion may be either fat-in-water, water-in-fat, or fat-in-water-in-fat emulsion. The rapid cooling and plasticizing step may be performed by processing the premixed emulsion in a buttermaking process (apparatus) such as a churning process, a cooling drum or passing the premixed emulsion through a tubular cooler such as a "Votator," "Perfector," "Kombinator," or a continuous buttermaking machine. When produced under rapid cooling and plasticizing conditions, the emulsion which is formed will be a fat-in-water emulsion and/or a fat-in-water-in-fat emulsion. When the premix emulsion is formed in the form of a fat-in-water emulsion and/or a fat-in-water-in-fat emulsion, the form of the emulsion should not be changed at this stage of the process. When a water-in-fat emulsion is formed during the premix emulsion stage, it must be transformed to a fat-in-water emulsion and/or a fat-in-water-in-fat emulsion under rapid cooling and plasticizing conditions. The thus formed fat-in-water emulsion and/or fat-in-water-in-fat emulsion are then inverted by mechanical working to get the margarine emulsion of the present invention which has a continuous fat phase.

The invention is further illustrated in the following examples:

EXAMPLE 1

A fat phase and aqueous phase formed from the following components were separately preformed.

| Fat Phase | | Aqueous Phase | |
|---|---|---|---|
| Hardened fish oil | 390 Kg | Codfish eggs | 15 Kg |
| Soybean oil | 209 Kg | Water | 385 Kg |
| Flavoring substance | 0.5 Kg | | |
| Coloring substance | 0.5 Kg | | |

The fat phase materials were added to the aqueous phase materials to form a fat-in-water emulsion at a temperature of from 45° C. to 55° C. The resulting emulsion was pasteurized at a temperature of 80° C. for 15 seconds and then cooled and held at a temperature of 8° C. for two hours and then the temperature it was raised to about 19° C. and held at this temperature for six hours. This was followed by cooling to a temperature of 12° C. and holding at that temperature for twelve hours. The mixture is then plasticized by being passed through a continuous buttermaking machine to produce the finished product. The finished product contained 0.14 ml/g of globular fats.

Comparative Example 1

| Fat Phase | | Aqueous Phase | |
|---|---|---|---|
| Hardened fish oil | 390 Kg | Egg yolks (hen) | 8 Kg |
| Soybean oil | 209 Kg | Water | 392 Kg |
| Flavoring substance | 0.5 Kg | | |
| Coloring substance | 0.5 Kg | | |

The aqueous phase was added to the fat phase to form a water-in-fat emulsion at a temperature of from 45° C. to 55° C. The resulting emulsion was rapidly cooled and plasticized by passing it through a Votator to produce the finished product. An analysis determined that the finished product did not contain any globular fats. This is attributed to the different processing when compared with Example 1 which in this instance produced a product in the form of a fat-in-water emulsion instead of the emulsion of the present invention which has a continuous fat phase.

Comparative Example 2

The method and materials of Example 1 was used, except that the aqueous phase was prepared by adding 8 Kg of egg yolk (hen) to 392 grams of water and the resultant aqueous phase was used instead of the aqueous phase set forth in Example 1. The globular fat content of the finished product was 0.07 ml/g. This resulted from the insufficient amount of lipoprotein in the emulsion.

EXAMPLE 2

A fat phase and aqueous phase formed from the following components were separately preformed.

| Fat Phase | | Aqueous Phase | |
|---|---|---|---|
| Palm oil | 520 Kg | Serum from cattle | 50 Kg |
| Sunflower oil | 278 Kg | Trout eggs | 30 Kg |
| Flavoring substance | 1 Kg | Skim milk powder | 30 Kg |
| Coloring substance | 1 Kg | Water | 1090 Kg |

The fat phase was added to the aqueous phase to form a fat-in-water emulsion at a temperature of from 45° C. to 55° C. The resulting emulsion was processed by centrifuging to form 930 Kg of cream (fat content 85% by weight) which was then rapidly cooled and plasticized by passing it through a continuous buttermaking machine to produce the final product. The amount of globular fats in the final product was 0.28 ml/g.

Comparative Example 3

The method of Example 2 are utilized. However 4 Kg of monoglyceride is added to the fat phase of Example 2 and the aqueous phase which is used in place of that of Example 2 is prepared by admixing 1168.4 Kg of water, 1.6 Kg of lecithin and 30 Kg of skim milk powder. The finished product did not contain any globular fat.

EXAMPLE 3

A fat phase and aqueous phase formed from the following components were separately preformed.

| Fat Phase | | Aqueous Phase | |
|---|---|---|---|
| Hardened fish oil | 520 Kg | Egg yolks (hen) | 25 Kg |
| Soybean oil | 129 Kg | Buttermilk Powder | 20 Kg |
| Flavoring substance | 0.5 Kg | Water | 305 Kg |
| Coloring substance | 0.5 Kg | | |

The fat phase was added to the aqueous phase to form a fat-in-water emulsion at a temperature of from 45° C. to 55° C. The resultant emulsion was pasteurized at a temperature of 80° C. for 15 seconds and then rapidly cooled and plasticized by passing it through a Kombinator to produce the finished product. The finished product contained globular fats in the amount of 0.24 ml/g.

EXAMPLE 4

A fat phase and aqueous phase formed from the following components were separately preformed.

| Fat Phase | | Aqueous Phase | |
|---|---|---|---|
| Hardened fish oil | 389 Kg | Soy protein | 30 Kg |
| Soybean oil | 208 Kg | Codfish eggs | 8 Kg |
| Sorbitan fatty acid esters | 1 Kg | Water | 362 Kg |
| Lecithin | 1 Kg | | |
| Flavoring substance | 0.5 Kg | | |
| Coloring substance | 0.5 Kg | | |

The fat phase was added to the aqueous phase to form a fat-in-water emulsion at a temperature of from 45° C. to 55° C. The resultant emulsion was pasteurized at a temperature of 80° C. for 15 seconds and then cooled and held at a temperature of 8° C. for 2 hours and then the temperature was raised to about 19° C. and held there for 16 hours and then cooled to a temperature of 12° C. and held at 12° C. for 10 hours. The mixture was then plasticized by passage through a continuous buttermaking machine to produce the finished product. The finished product contained 0.13 ml/g of globular fats.

EXAMPLE 5

A fat phase and aqueous phase formed from the following components were separately preformed.

| Fat Phase | | Aqueous Phase | |
|---|---|---|---|
| Palm oil | 520 Kg | Serum from cattle | 50 Kg |
| Sunflower oil | 276 Kg | Salmon eggs | 25 Kg |
| Sucrose fatty acid esters | 1 Kg | Skim milk powder | 30 Kg |
| Lecithin | 1 Kg | Water | 1095 Kg |
| Flavoring substance | 1 Kg | | |
| Coloring substance | 1 Kg | | |

The fat phase was added to the aqueous phase to form a fat-in-water emulsion at a temperature of from 45° C. to 55° C. The resultant emulsion was processed by centrifuging to form 935 Kg of cream (fat content 85% by weight) which was then rapidly cooled and plasticized by passing it through a continuous buttermaking machine to produce the finished product which contained 0.26 ml/g of globular fats.

EXAMPLE 6

A fat phase and aqueous phase formed from the following components were separately preformed.

| Fat Phase | | Aqueous Phase | |
|---|---|---|---|
| Hardened fish oil | 517 Kg | Egg yolks (hen) | 25 Kg |
| Soybean oil | 130 Kg | Buttermilk powder | 20 Kg |
| Flavoring substance | 0.5 Kg | Water | 305 Kg |
| Coloring substance | 0.5 Kg | | |
| Glycerine fatty acid esters | 1 Kg | | |
| Sucrose fatty acid ester | 1 Kg | | |

The fat phase was added to the aqueous phase to form a fat-in-water emulsion at a temperature of from 45° C. to 55° C. The resulting emulsion was pasteurized at a temperature of 80° C. for fifteen seconds and then rapidly cooled and plasticized by passing it through a Kombinator to produce the finished product which contained 0.28 ml/g of globular fats.

A sample of each of the finished products of Examples 1–6 and of the Comparative Examples 1–3 and also a sample of butter and of synthetic cream were aerated with syrup and liquor to obtain a sample which was then tested to assess its flavor. A 300 gram sample of the margarine emulsion of the finished product of each of Examples 1–6 and of the Comparative Examples 1–3, and also of butter, was whipped at high speed for fifteen minutes together with 75 grams of liquid sugar (Brix 75), 5 grams of rum, in a "Kenwood-Mixer". A 300 gram sample of said synthetic cream was whipped at a temperature of about 5° C. for four and one-half minutes admixed with 75 grams of liquid sugar (Brix 75) and 5 grams of rum in a "Kenwood-Mixer." The temperature of the final product was about 10° C.

In order to assess the flavor and set standards to judge assessment of the margarine emulsions of the present invention, the aforenoted synthetic cream which was whipped to form a standard whipping cream is used as the whipping cream standard. The buttercream of the Comparative Example 3 was used as the standard buttercream. The cream flavors and characteristics were assessed by 20 members of a sensory taste panel. The assessment is expressed in numerical values ranging from 0 to 20 wherein the number "20" represents a flavor assessment indistinguishable from whipping cream; "15" represents a close resemblance or similarity to whipping cream; "10" represents a moderate resemblance or similarity to whipping cream and buttercream; "5" represents a close resemblance or similarity to buttercream; and "0" represents a flavor indistinguishable from buttercream. The sensory panel was permitted to assign values which are intermediate to the numerical values set forth hereinbefore which are in steps of five. The averaged results of the flavor assessments made by the test panel follow

TABLE 2

| Product | Amount of globular fats (ml/g) | Content of Lipoprotein % | Average |
|---|---|---|---|
| Example 1 | 0.14 | 0.68 | 18 |
| Example 2 | 0.28 | 2.70 | 19 |
| Example 3 | 0.24 | 1.10 | 20 |
| Example 4 | 0.13 | 0.36 | 18 |
| Example 5 | 0.26 | 2.25 | 19 |
| Example 6 | 0.28 | 1.10 | 20 |
| Comparative Example 1 | — | 0.36 | 1 |
| Comparative Example 2 | 0.07 | 0.36 | 4 |
| Comparative Example 3 | — | — | 0 |
| Butter | 0.02 | | 2 |

The results set forth in the foregoing table establish that the flavor of the margarine emulsion of the present invention in the form of whipping cream establishes a large difference in the flavor assessment dependent upon whether the globular fat content is more or less than 0.1 ml/g.

The whipped product of Examples 1–6 have the same good processing characteristics as buttercream when they are formed into flower shapes on top of cakes. After being in freezing storage at temperatures of −20° C. for three months, and then tested, they were determined to have the same thin melting characteristic that they had before storage.

The whipped products of Examples 1 and 4, of Comparative Example 1, and of synthetic cream were stored at a temperature of 10° C. The results reporting the number of days before which deterioration occurred as a result of attack by mold and the like are set forth in the following table

TABLE 3

| Whipped Product | Oil Content (%) | Preservative | Days Before Deterioration Occurred |
|---|---|---|---|
| Example 1, 4 | 60 | nil | 30–35 days |
| Comparative Example 1 | 60 | nil | 30–38 days |
| Synthetic Cream | 60 | nil | 3–7 days |

It is apparent from the data in the aforenoted table that the emulsion products of the present invention have far better storage characteristics than synthetic cream.

EXAMPLE 7

A fat phase and aqueous phase formed from the following components were separately preformed.

| Fat Phase | | Aqueous Phase | |
|---|---|---|---|
| Butterfat | 160 Kg | Buttermilk powder | 81 Kg |
| Hardened vegatable fat | 40 Kg | Egg yolks (hen) | 40 Kg |
| | | Salt | 17 Kg |
| Soybean oil | 195 Kg | Flavoring substance | 0.5 Kg |
| Glycerol fatty acid esters | 4 Kg | Gelatin | 0.3 Kg |
| Coloring substance | 0.5 Kg | Water | 458.5 Kg |

The fat phase was added to the aqueous phase to form a fat-in-water emulsion at a temperature of from 50° C. to 60° C. The resultant emulsion was pasteurized at a temperature of 80° C. for fifteen seconds and then rapidly cooled and plasticized by passing it through a Kombinator to produce the final product which contained 0.38 ml/g of globular fats. The margarine emulsion of this example is useful as a low calorie spread having a high protein content. The mouth feel and flavor of said emulsion is closer to that of cream as compared to the ordinary (conventional) low calorie spread.

The method of JAS margarine fat measurement is as follows;
  1.0–1.5 g of a sample is weighted into a 50 ml beaker. The sample is admixed with ether in a separating funnel. Anhydrous Sodium Sulfate is added into the sample solution to dehydrate. The sample solution filtrated into a 250 ml Erlenmeyer's flask. After ether is removed, the sample is dryed at 105° C. for 20–30 minutes. Thus the fat content is obtained.

What is claimed is:

1. An edible emulsion having good whipping characteristics comprising an aqueous phase dispersed in a continuous fat phase,
   said aqueous phase being selected from the group consisting of (i) an aqueous phase comprising water and lipoprotein material and (ii) an aqueous phase comprising water containing lipoprotein coated globular fat particles,
   said continuous fat phase also having dispersed therein globular fat particles which are coated with lipoprotein,
   said emulsion consists essentially of between about 25% and 90% by weight of total fat based on the weight of the emulsion and between about 10% and 75% of total aqueous phase based on the weight of the emulsion, said total fat comprising the globular fat particles and the continuous fat phase, and said globular fats are present in an amount more than about 0.1 ml per gram of total fat, with the proviso that when said emulsion contains at least one emulsifier the amount of lipoprotein is at least 0.3 ml per gram of total fat and when said emulsion does not contain an emulsifier the amount of lipoprotein is at least 0.6 ml per gram of total fats.
2. The emulsion of claim 1 which contains at least one emulsifier in the amount between about 0.008 and 3% by weight of said emulsion.
3. The emulsion of claim 2 wherein said at least one emulsifier is selected from the group consisting of
   glycerol fatty acid esters,
   derivatives of glycerol fatty acid esters,
   sucrose fatty acid esters,
   sorbitan fatty acid esters,
   propylene glycol fatty acid esters,
   lechithin, polyoxyethylene fatty acid esters,
polyoxyethylene sorbitan fatty acid esters,
polyglycerol fatty acid esters, and
glycerol or polyglycerol condensed fatty acid esters.

4. The emulsion of claim 1 wherein the emulsion does not contain an emulsifier and the amount of lipoprotein is at least about 1.3% by weight of said emulsion.

5. The emulsion of claim 2 or claim 3 wherein the amount of said lipoprotein is at least about 0.7% by weight of said emulsion.

6. The emulsion of claim 3 or 4 wherein said aqueous phase is in an amount between 25% and 60% based on the weight of the emulsion.

7. The emulsion of claim 6 wherein said globular fat content of said emulsion is below about 1.5 ml per gram of total fat.

8. The emulsion of claim 1 wherein said globular fat content of said emulsion is below about 1.5 ml per gram of total fat.

9. The emulsion of claim 1 wherein said aqueous phase comprises water and lipoprotein material.

10. The emulsion of claim 1 wherein said aqueous phase comprises water-containing lipoprotein coated globular fat particles.

11. The emulsion of claim 1 or claim 3 which is whipped.

12. The emulsion of claim 5 wherein said aqueous phase is in an amount between 25% and 60% based on the weight of the emulsion.

13. The emulsion of claim 12 wherein said globular fat content of said emulsion is below about 1.5 ml per gram of total fat.

14. The emulsion of claim 7 containing at least 1.3 ml per gram of total fat when said emulsion does not contain an emulsifying agent and containing at least 0.7 ml of lipoprotein per gram of total fat when said emulsion contains an emulsifying agent.

15. The emulsion of claim 13 containing at least 0.7 ml of lipoprotein per gram of total fat.

* * * * *

UNITED STATES PATENT AND TRADEMARK OFFICE
CERTIFICATE OF CORRECTION

PATENT NO. : 4,396,638

DATED : August 2, 1983

INVENTOR(S) : Hiroshi EDO et al

It is certified that error appears in the above-identified patent and that said Letters Patent is hereby corrected as shown below:

Title Page, left column, the first line of the title, before "EDIBLE" insert --EMULSION--.

Title Page, left column, under the line which reads "Jul. 19, 1980 [JP] Japan.....55-98934", insert the following line --May 18, 1981 [JP] Japan.....56-74586--.

Signed and Sealed this

Seventeenth Day of April 1984

[SEAL]

Attest:

Attesting Officer

GERALD J. MOSSINGHOFF

Commissioner of Patents and Trademarks